UNITED STATES PATENT OFFICE.

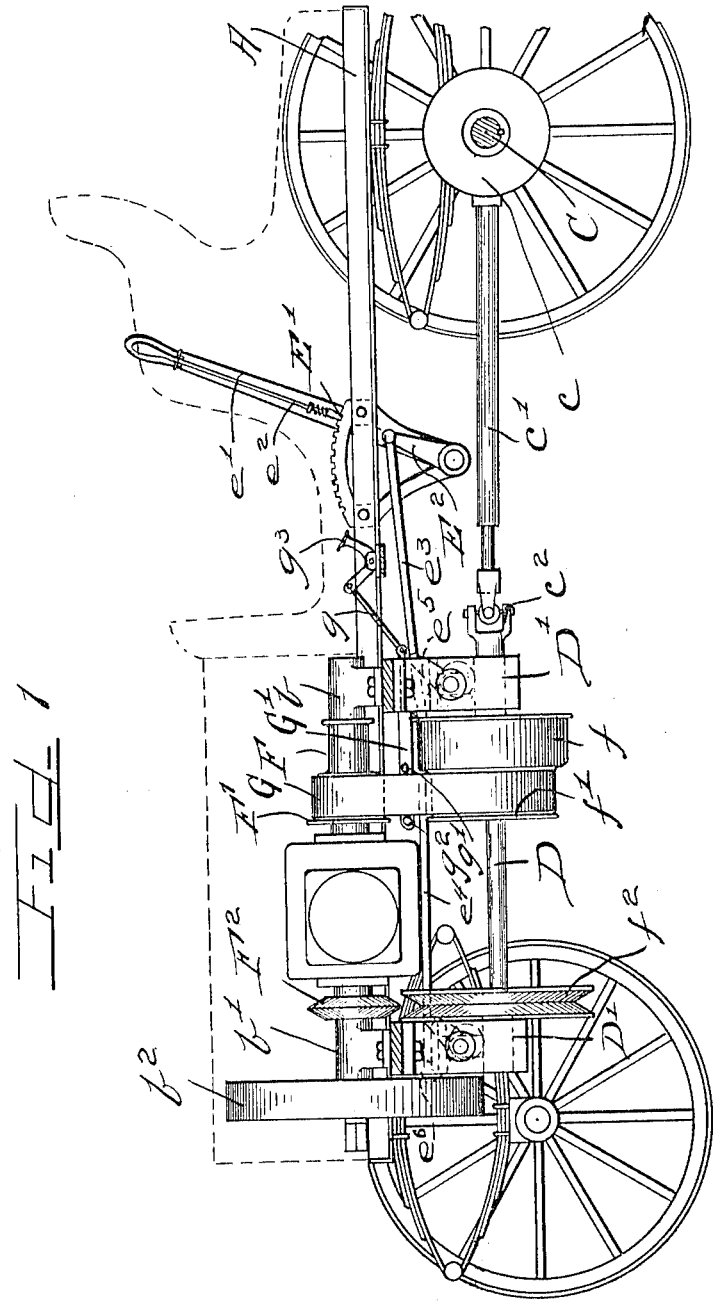

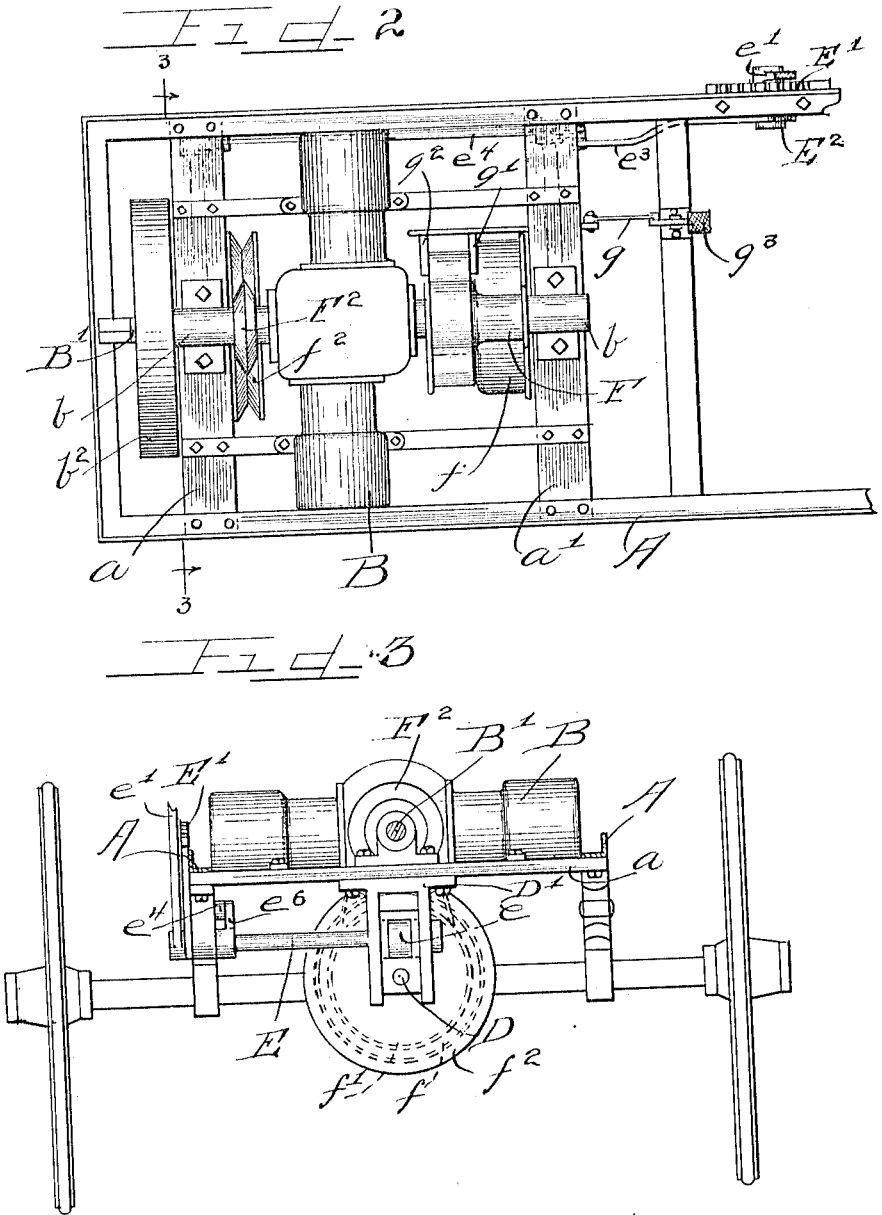

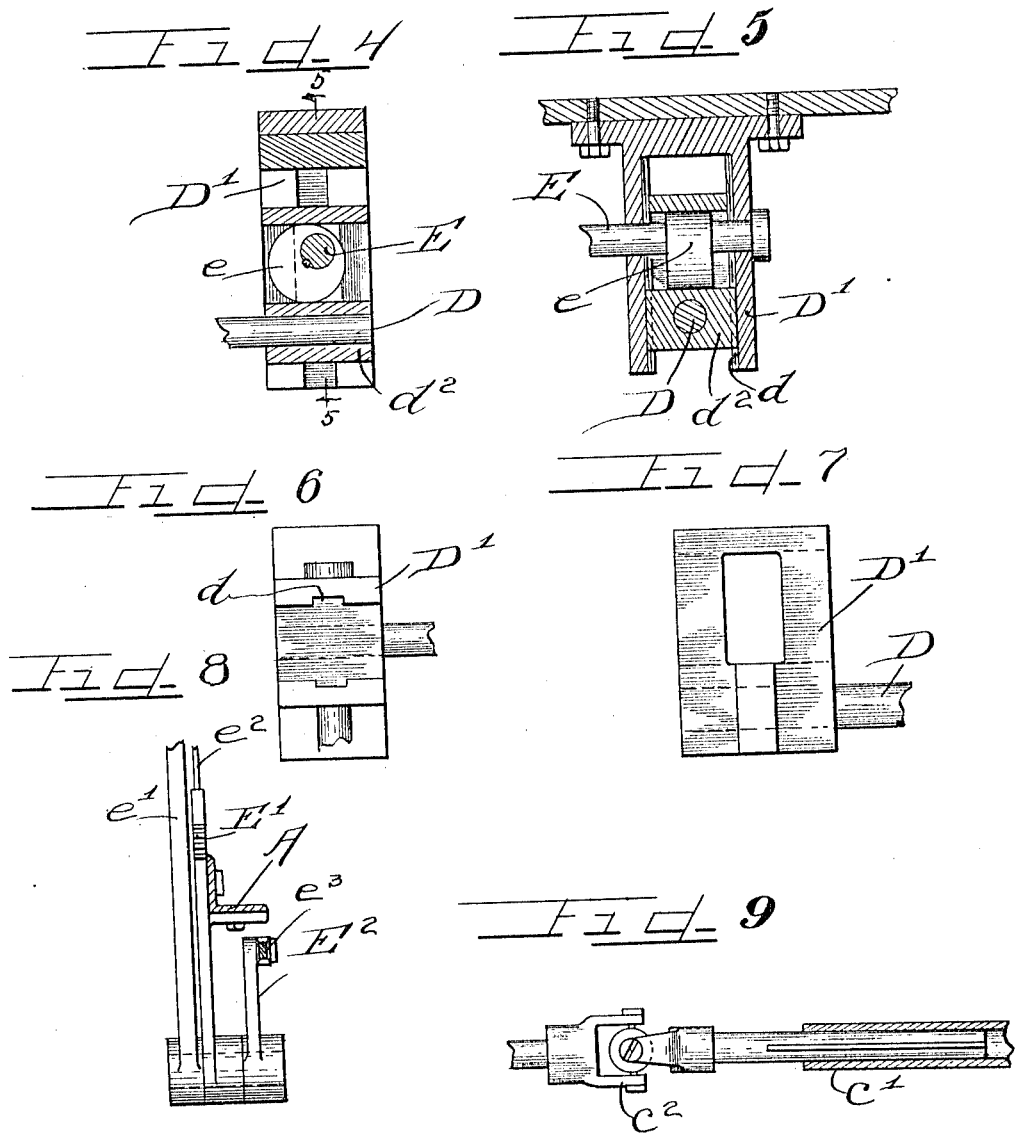

WILLIAM C. PRICE, OF CHICAGO, ILLINOIS, ASSIGNOR, BY MESNE ASSIGNMENTS, TO F. P. MOTOR WAGON COMPANY, A CORPORATION OF SOUTH DAKOTA.

GEARING FOR MOTOR-VEHICLES.

1,072,165.   Specification of Letters Patent.   Patented Sept. 2, 1913.

Application filed October 9, 1907, Serial No. 396,679. Renewed March 8, 1913. Serial No. 753,078.

*To all whom it may concern:*

Be it known that I, WILLIAM C. PRICE, a citizen of the United States, and a resident of Chicago, Cook county, Illinois, have invented certain new and useful Improvements in Gearing for Motor-Vehicles; and I do hereby declare that the following is a full, clear, and exact description of the same, reference being had to the accompanying drawings, and to the letters of reference marked thereon, which form a part of this specification.

Heretofore various devices for the purpose of transmitting the power from the motor or engine to the driving wheels have been used, some of which have employed friction but most of which have employed gears either for change speed mechanism or for reversing or for all the drives of which the vehicle is capable. Gears for this purpose are objectionable owing to the fact that the severe stresses to which such gears are subjected often cause the same to strip, entailing considerable expense for repairs as well as putting the vehicle out of action until repairs are completed.

The object of this invention is to provide gearless transmitting mechanism whereby a plurality of speeds ahead are possible and whereby reversal is accomplished by disconnecting the frictional driving means and connecting frictional reversing means.

It is also an object of the invention to afford a transmitting mechanism whereby a belt or belts are employed to afford the different speeds in one direction and direct friction employed for propelling in the other.

It is an object of the invention also to provide a belt driven transmission capable of several speeds ahead and in which tension is applied to the belt by movement of the transmission shaft.

It is finally an object of the invention to afford an exceedingly cheap, simple, strong and durable construction adapted for general use for the purpose described and for application to any other mechanisms wherein a plurality of speeds in one direction are provided in connection with frictional mechanism for reversing.

The invention consists of the matters hereinafter described and more fully pointed out and defined in the appended claims.

In the drawings: Figure 1 is a view in longitudinal section of a motor vehicle embodying my invention and showing the body and hood in dotted lines. Fig. 2 is a top plan view of the motor or engine and transmission. Fig. 3 is a section taken on line 3—3 of Fig. 2. Fig. 4 is an enlarged detail section of the bearing and shifting means for the transmission shaft. Fig. 5 is a section taken on line 5—5 of Fig. 4. Fig. 6 is a bottom plan view of the bearing. Fig. 7 is a side elevation thereof. Fig. 8 is an enlarged fragmentary detail with the arrangement of shifting levers. Fig. 9 is an enlarged fragmentary detail of the universal coupling and the driving shaft.

As shown in the drawings: A indicates the chassis frame for the vehicle which may be constructed in any desired or suitable manner but as shown, is constructed of angle bars affording side frame members and end frame members. Supported upon the side frame members is the motor B, in this instance shown as a double opposed explosive engine, though, of course, any preferred type of motor or engine may be used. The driving shaft B' of said motor is journaled in suitable bearings $b$—$b'$ upon transverse sill members or beams $a$—$a'$ which at their ends are rigidly secured on the side frame members. On the forward extremity of the shaft is secured the balance wheel $b^2$ and as shown, the extremity of said shaft is shaped or constructed in any suitable manner to adapt the same to be engaged by the crank in starting the motor.

As shown, a shaft drive is employed, the rear axle C for that purpose being provided with a differential $c$ and being driven by the longitudinal driving shaft $c'$ which is formed hollow at its rear end, as shown in Fig. 9, and is splined to shaft $c^3$ that in turn is connected by means of a universal joint $c^2$ with the vertical movable transmission shaft D. Said transmission shaft D is journaled to move vertically. For this purpose a yoke D' is rigidly bolted on the under side of each of the transverse beams $a$—$a'$ and is provided in each arm with a vertical groove $d$ as shown in Figs. 4, 5 and 6, and slidably secured therein is a bearing or boxing $d^2$ in which the ends of the transmission shaft D are journaled, and an actuating shaft E journaled through the arms of said yoke extends through a suitable aperture in said bearing block and is provided therein with a cam or eccentric $e$ rigidly secured thereon so that rotation of the shaft E serves to shift the block $d^2$ vertically causing corresponding adjustment of the transmission shaft. For the purpose of accomplishing this adjustment a segment E' is rigidly secured on one of the side frame members and pivotally engaged at its lower end below the same is a lever $e'$ provided with a detent $e^2$ adapted to engage said segment. On the inner end of the shaft whereon the lower end of said lever is secured is provided an upwardly directed arm or lever $E^2$ and pivotally engaged thereon at its rear end is a connecting rod $e^3$, the forward end of which pivotally engages a bar $e^4$, which connects the cranks $e^5$—$e^6$ secured respectively on the adjusting shafts E at each end of the transmission shaft. Said cranks are so set relatively to the cam or eccentric $e$ on the adjusting shaft, that forward movement of the lever $e'$ serves to elevate the transmission shaft and rearward movement of the lever $e'$ serves to depress said shaft.

Rigidly keyed on the engine shaft B' as shown at the rear end thereof, are driving belt pulleys F—F' both of which, as shown, are flanged at the outer ends and of which as shown, the rear pulley F is the smaller. Also rigidly engaged on the engine shaft in advance of the engine is a double bevel friction member $F^2$. Rigidly keyed on the transmission shaft and also flanged at the outer ends are driving pulleys $f$—$f'$ which, as shown, are larger than the corresponding pulleys F—F' directly above the same on the engine shaft and are complemental therewith in diameter, so that the driving belt G acts equally well when engaged on the driving pulley F and the small pulley $f$ or the driving pulley F' and the small pulley $f'$. Near the forward end of said transmission shaft D is the grooved friction pulley $f^2$ of relatively large size as compared with the beveled friction member $F^2$ and the groove in the same is complemental with the bevel of said friction member.

Belt shifting mechanism is provided to shift the belt G from the forward larger driving pulley and smaller transmission pulley to the smaller driving pulley F and larger transmission pulley $f$ for various speeds. For this purpose any convenient mechanism may be employed. As shown however, a rod G' is provided with fingers $g'$—$g^2$ which engage on each side of the belt and said rod extends longitudinally of the chassis and is connected at its rear end by means of a connecting rod $g$ with a foot lever $g^3$, which is shaped to be moved in either direction by the foot, rearward movement thereof tending to shift the belt to the smaller driving pulley F to afford greater power while opposite movement of said lever serves to shift the belt to the larger driving pulley F' for greater speed.

The operation is as follows: In starting the vehicle ahead the belt may be in either position. Shifting the lever $e'$ rearwardly forces the transmission shaft downwardly by rotation of the cams $e$, thus tightening the belt; and, of course, the tension on the belt may be adjusted in starting to permit sufficient slippage to prevent undue stress being applied to the mechanism. As the vehicle gathers way the lever $e'$ is pushed still farther rearward to provide any desired degree of tension on said belt to obviate slippage. Should it be desired to shift to the other driving pulley the lever $e'$ is released sufficiently to remove the tension from the belt and the foot lever $g^3$ is shifted to produce the desired movement of the belt in either direction. Should it be desired to reverse, the lever $e'$ is thrown forwardly to elevate the transmission shaft D bodily sufficiently to bring the grooved friction pulley $f^2$ into engagement with the driving friction member $F^2$. This, if the vehicle is moving ahead, serves of course, as a powerful brake and quickly stops the forward movement and reverses the motion of the car and owing to the simple construction shown, the rearward movement can be immediately stopped by throwing the lever rearwardly again bringing tension upon the belt which now serves as a brake to stop the rearward movement and to again propel the car forwardly. Of course, the grooved transmission friction pulley $f^2$ may be constructed wholly of metal or of any other suitable material either wholly or in part to produce the desired results and to obviate noise and wear, or the friction pulley may be constructed wholly of metal and the driving friction member $F^2$ may be either constructed of other material or faced with other material such as leather, rubber, wood or any material suitable for the purpose.

Of course, I am aware that the particular shifting mechanism for moving the transmission shaft may be constructed in a variety of ways. I therefore do not purpose limiting myself otherwise than as necessitated by the prior art as many details of construction may be varied without departing from the principles of my invention.

I claim as my invention:

1. A transmission gearing for motor vehicles and the like, comprising a frame, a driving shaft, an adjustable driven shaft, coacting members on said shafts for driving the driven shafts in one direction, coacting friction members on said shafts for reversing the driven shaft, yokes rigidly secured to the frame, an adjusting shaft journaled therein, bearing blocks slidable in said yokes and supporting the driven shaft, and eccentrics secured to the adjusting shaft adapted to adjust the blocks in the yokes.

2. A transmission gearing for motor vehicles and the like, comprising a frame, parallel drive and driven shafts, pulleys thereon, a belt trained around a corresponding pair of pulleys, coacting friction members on said shafts, an eccentric mechanism for vertically adjusting one of said shafts in a right line, and a foot operated member for shifting said belt.

3. A transmission gearing for motor vehicles and the like, comprising a frame, a driving shaft, a transmission shaft, vertically adjustable bearings for said transmission shaft, eccentric means for simultaneously adjusting the bearings and the transmission shaft in a right line vertically relatively to the driving shaft, a driving friction connection between said shafts for movement in one direction, and friction members on said shafts adapted to contact for reverse movement.

4. A transmission gearing for motor vehicles and the like, comprising a frame, a driving shaft, a transmission shaft, pulleys on said shafts, a belt trained around said pulleys, reversing mechanism on said shafts, yokes rigidly secured to said frame, an adjusting shaft journaled in said yokes, bearing blocks slidable in said yokes and supporting the transmission shaft, eccentrics secured to said adjusting shaft and adapted to adjust said blocks in said yokes, and a lever pivoted to the frame for operating said adjusting shaft to shift the transmission shaft vertically to thereby control the belt and reversing mechanism.

In testimony whereof I have hereunto subscribed my name in the presence of two subscribing witnesses.

WILLIAM C. PRICE.

Witnesses:
 C. W. HILLS,
 K. E. HANNAH.

---

Copies of this patent may be obtained for five cents each, by addressing the "Commissioner of Patents, Washington, D. C."